(12) United States Patent
Nakajima et al.

(10) Patent No.: US 12,540,634 B2
(45) Date of Patent: Feb. 3, 2026

(54) CALIBRATION SYSTEM IN HYDRAULIC SYSTEM

(71) Applicant: Caterpillar SARL, Geneva (CH)

(72) Inventors: Hideki Nakajima, Akashi (JP); Koichi Kiyasu, Akashi (JP); Toshikazu Koga, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/865,991

(22) PCT Filed: May 26, 2023

(86) PCT No.: PCT/EP2023/025251
§ 371 (c)(1),
(2) Date: Nov. 14, 2024

(87) PCT Pub. No.: WO2023/227252
PCT Pub. Date: Nov. 30, 2023

(65) Prior Publication Data
US 2025/0137475 A1 May 1, 2025

(30) Foreign Application Priority Data

May 27, 2022 (JP) ................................ 2022-086776

(51) Int. Cl.
*F15B 19/00* (2006.01)
*F15B 21/02* (2006.01)
*E02F 9/22* (2006.01)

(52) U.S. Cl.
CPC ............ *F15B 19/002* (2013.01); *F15B 21/02* (2013.01); *E02F 9/2228* (2013.01);
(Continued)

(58) Field of Classification Search
CPC .......... F15B 19/002; F15B 2211/30535; F15B 2211/355; F15B 2211/36; F15B 2211/6316; F15B 2211/6355; F15B 21/02
See application file for complete search history.

(56) References Cited

U.S. PATENT DOCUMENTS

| 6,192,299 B1* | 2/2001 | Kubota ................... B29C 45/77 700/282 |
| 10,526,765 B2* | 1/2020 | Fujii ..................... E02F 3/3677 |
| 2021/0332563 A1* | 10/2021 | Kanazawa ............ F15B 13/025 |

FOREIGN PATENT DOCUMENTS

| DE | 102020206343 A1 * | 11/2021 | ............. G01F 25/10 |
| JP | 2986818 B2 | 12/1999 | |

(Continued)

OTHER PUBLICATIONS

International Search Report related to Application No. PCT/EP2023/025251 reported on Aug. 3, 2023.

*Primary Examiner* — Andrew H Nguyen

(57) ABSTRACT

Problem: Calibration to make the correspondence relationship between the operation amount of the operator and the supply flow rate to the hydraulic actuator be a preset setting relationship is made easy. Solution: The control valve that controls the supply flow rate to the hydraulic actuator is configured with a spool valve, a pressure compensation valve that maintains a front and rear differential pressure of the spool valve to be constant, and electromagnetic proportional valves that output pilot pressure to the spool valve, and a measured data that actually measures the correspondence between the output pilot pressure from the electromagnetic proportional valves and the supply flow from the control valve before the control valve is installed in the working machine is configured to calibrate the correspond- (Continued)

ing data of the operation amount of the operator and the output current value to the electromagnetic proportional valves.

2 Claims, 4 Drawing Sheets

(52) U.S. Cl.
CPC ............... *F15B 2211/20553* (2013.01); *F15B 2211/30535* (2013.01); *F15B 2211/327* (2013.01); *F15B 2211/355* (2013.01); *F15B 2211/36* (2013.01); *F15B 2211/6316* (2013.01); *F15B 2211/6355* (2013.01); *F15B 2211/857* (2013.01)

(56) References Cited

FOREIGN PATENT DOCUMENTS

| | | | |
|---|---|---|---|
| JP | 2001289202 | A | 10/2001 |
| JP | 2007278490 | A | 10/2007 |
| JP | 2008303813 | A | 12/2008 |
| JP | 2016145592 | A | 8/2016 |
| JP | 2017190858 | A | 10/2017 |

\* cited by examiner

|  | Operating amount of the operator | Output current value | Output pilot pressure | Supply flow rate |
|---|---|---|---|---|
| Corresponding data CD | 50% | 1A | — | — |
| Setting data SD | 50% | — | — | 150L/m |
| Measured data AD | — | — | 2MPa | 150L/m |
| Calibrated output current value | — | 0.9A | 2MPa | — |
| Calibrated corresponding data | 50% | 0.9A | — | — |

FIG.4

CALIBRATION SYSTEM IN HYDRAULIC SYSTEM

CROSS-REFERENCE TO RELATED APPLICATION

This Application is a 35 USC § 371 US National Stage filing of International Application No. PCT/EP2023/025251 filed on May 26, 2023 which claims priority to Japanese Patent Application No. 2022-086776 filed on May 27, 2022.

FIELD OF THE DISCLOSURE

The present invention relates to a technical field of calibration system in hydraulic system of working machines such as a hydraulic excavator.

BACKGROUND

Generally, the hydraulic system of a working machine such as a hydraulic excavator is provided with a control valve for controlling oil supply and discharge of various hydraulic actuators, but some of such control valves are composed of an electromagnetic proportional pressure reducing valve operated by a control signal output from a controller based on an operation of an operator for the hydraulic actuator, and a spool valve operated by a pilot pressure output from the electromagnetic proportional valve to control a flow rate. However, when the control valve composed of the electromagnetic proportional pressure reducing valve and the spool valve is used to control the supply flow rate of the hydraulic actuator, due to the manufacturing tolerance of the electromagnetic proportional pressure reducing valve, the relationship between the operation amount of the operator and the supply flow rate from the control valve to the hydraulic actuator varies, and even if the operation amount of the operator is the same, there is a risk that the operating speed of the hydraulic actuator will differ for each body, thereby impairing the uniformity of the operation. In order to avoid this situation, it is required to calibrate the relationship between the operation amount of the operator and the supply flow rate to a preset relationship.

Consequently, the spool valve constituting the control valve is integrally provided with an on-off valve structure having a passage opening position and a passage closing position set in a positional relationship in relation to a stroke of the spool valve, and an input current value to the electromagnetic proportional valve at the time of a change in the pressure of the passage is measured by the on-off valve structure. An actual measurement characteristic of the input current of the electromagnetic proportional valve and the stroke of the spool valve is obtained, and a reference characteristic is calibrated based on the actual measurement characteristic (see, for example, Patent Document 1).

PRIOR ART DOCUMENTS

Patent Document

Patent Document 1: Japanese Patent Publication No. 2007-278490

SUMMARY OF THE INVENTION

Problems to be Solved by the Invention

However, the control valve in Patent Document 1 has a special structure in which an on-off valve structure portion is integrally formed in the spool valve. Since the control valve with such a special structure can only be manufactured by customization, the cost is high, and because the control valve becomes larger, it is difficult to secure the mounting space on the body. Therefore, it is required to be able to perform calibration easily without using such a special structure, which is a problem to be solved by the present invention.

Means for Solving the Problem

The invention is created to solve the problem based on the above actual situation. The invention according to Claim 1 provides a calibration system in a hydraulic system, wherein in a hydraulic system of a working machine including a hydraulic actuator, a control valve for controlling a supply flow rate of the hydraulic actuator, an operator for driving the hydraulic actuator, and a control means for controlling the control valve based on an operation of the operator, when calibration is performed to set a corresponding relationship between an operation amount of the operator and a supply flow rate to the hydraulic actuator, the control valve has a spool valve which opens an opening for supplying the hydraulic actuator under an opening area corresponding to an input pilot pressure, a pressure compensation valve which keeps a differential pressure of the opening for supplying of the spool valve, and an electromagnetic proportional valve which outputs the pilot pressure to the spool valve according to a current value outputted from the control means; wherein the control means has corresponding data of the operation amount of the operator and a current value outputted to the electromagnetic proportional valve, and on the one hand, controls the control valve by outputting the current value corresponding to the operation amount of the operator to the electromagnetic proportional valve based on the corresponding data, while calibrating a corresponding relationship between an output pilot pressure of the electromagnetic proportional valve and a supply flow rate output by the control valve using actual measured data before the control valve is installed on the working machine, wherein the calibration system for performing the calibration is provided with a pressure detecting means for detecting an output pilot pressure from the electromagnetic proportional valve to the spool valve; an output current control means for outputting a current to the electromagnetic proportional valve when performing calibration; a calibration means for calibrating the corresponding data by taking an output pilot pressure from the electromagnetic proportional valve in the measured data as a target pilot pressure at a time of the supply flow rate corresponding to the preset set relationship in the operation amount of the operation point and taking an output current value to the electromagnetic valve from the output current control means when the pilot pressure detected by the pressure detecting means becomes the target pilot pressure as an output current value corresponding to the operation amount of the operator of the calibration point.

The invention according to claim 2 provides a calibration system in a hydraulic system, wherein in the hydraulic system of a working machine including a hydraulic actuator, a control valve for controlling a supply flow rate to the hydraulic actuator, an operator for driving the hydraulic actuator, and a control means for controlling the control valve based on an operation of the operator, when a corresponding relationship between the operation amount of the operator and the supply flow rate to the hydraulic actuator is calibrated to a preset setting relationship, the control valve comprises a spool valve which opens a supplying opening to the hydraulic actuator in an opening area corresponding to the input pilot pressure, a pressure compensation valve which maintains a constant differential pressure before and after the supply opening of the spool valve, and an electromagnetic proportional valve which outputs a pilot pressure corresponding to a current value output from the control means to the spool valve, wherein the control means has corresponding data of the operator operation amount and the output current value to the electromagnetic proportional valve, and on the one hand, controls the control valve by outputting a current value corresponding to the operation amount of the operator to the electromagnetic proportional valve based on the corresponding data, while using measured data measuring the corresponding relationship between the an input current value to the electromagnetic valve and the supply flow rate output from the control valve at a stage before the control valve is installed in the working machine, wherein the calibration system for the calibration is provided with an output current control means for outputting an current to the electromagnetic proportional valve at performing the calibration, and a calibration means for calibrating the corresponding data by taking the input current value to the electromagnetic proportional valve in the actual measured data when the supply flow rate corresponds to the operation amount of the operator of calibration point by the preset setting relationship as the output current value corresponding to the operation amount of the operator of the calibration point.

Effect of the Invention

By implementing the invention of claims 1 and 2, high-precision calibration can be carried out efficiently and easily, and a control valve of a special structure for calibration is not required, thereby contributing to the suppression of cost increases.

BRIEF DESCRIPTION OF THE DRAWINGS

FIG. 4 is a tabular diagram illustrating a specific example of each data.

DETAILED DESCRIPTION OF BEST MODE FOR CARRYING OUT THE INVENTION

Figure 1:
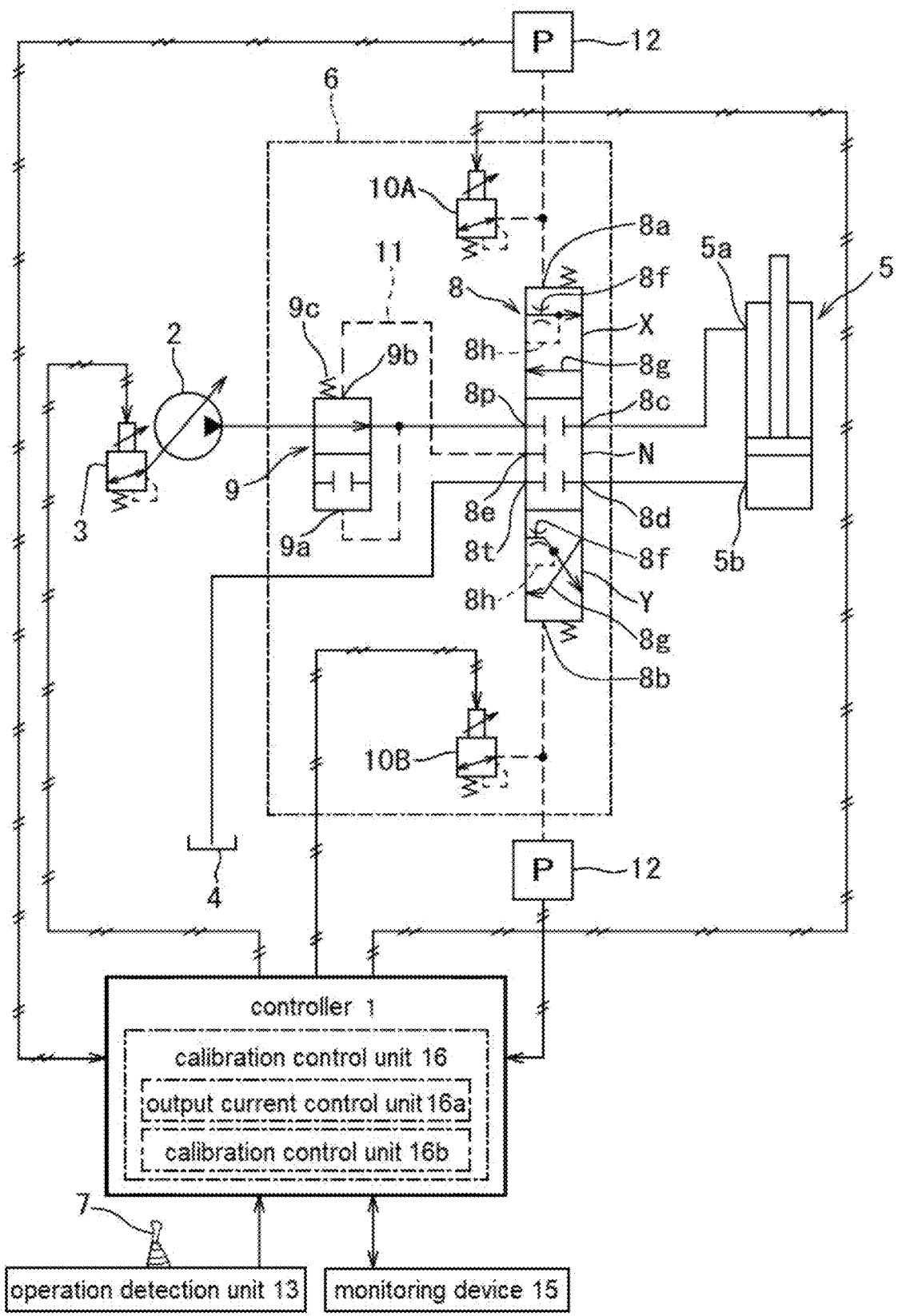
FIG. 1 is a hydraulic circuit diagram illustrating a part of a hydraulic system of a working machine.

Embodiments of the present invention will be described below with reference to the drawings. FIG. 1 illustrates a part of a hydraulic system provided on a working machine, such as a hydraulic excavator. In FIG. 1, 1 represents an on-board controller (equates to the control means of the present invention), 2 represents a hydraulic pump, 3 represents a electromagnetic pump proportional valve for a pump that operates on the basis of a control signal from the controller 1 to make the capacity of the hydraulic pump 2 variable, 4 represents an oil tank, 5 represents a hydraulic actuator using the hydraulic pump 2 as a hydraulic source, 6 represents a control valve that performs feed and discharge control for the hydraulic actuator 5 based on a control signal from the controller 1, and 7 represents an operator (an operating lever, an operating pedal, etc.) that is operated to drive the hydraulic actuator 5.

Note that in the present embodiment, the pressure oil is supplied to the hydraulic actuator 5 in two directions, such as a bidirectional rotating motor and a double-acting cylinder, and the pressure oil is supplied in one direction by operating the operator 7 to one side and in the other direction by operating to the other side.

In addition, in the case where the working machine is a hydraulic excavator, for example, various hydraulic actuators such as boom cylinders, stick cylinders, bucket cylinders, travel motors, swivel motors, and hydraulic actuators for optional attachments are provided in the hydraulic excavator, and control valves and operators for each hydraulic actuator are also provided. However, FIG. 1 illustrates only one hydraulic actuator 5, one control valve 6, and one operator 7 that are subject to the present invention.

The control valve 6 is configured to include a pilot-actuated spool valve 8 described later, a pressure compensation valve 9 disposed on an upstream side of the spool valve 8, and a first electromagnetic proportional valve 10A and a second electromagnetic proportional valve 10b which both output pilot pressures to the spool valve 8.

Figure 2:
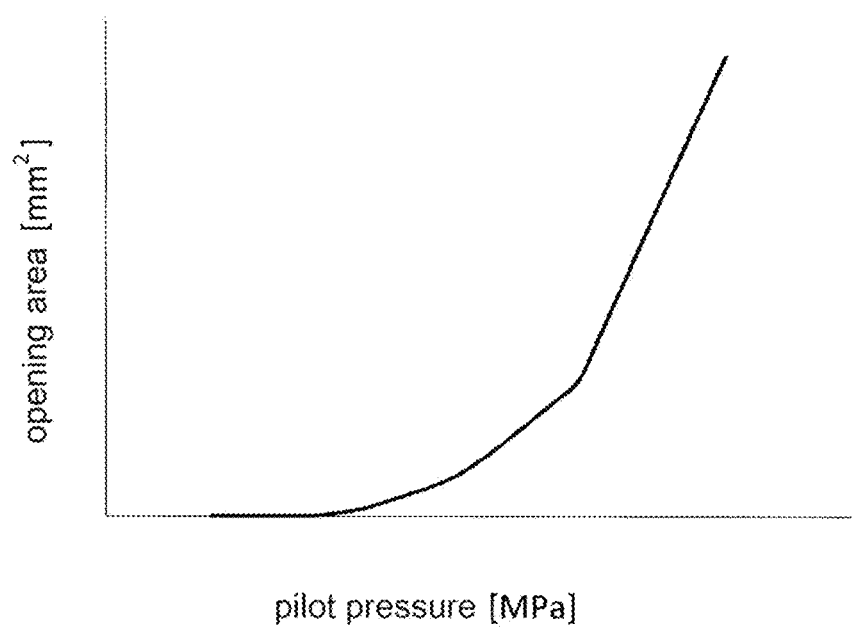
FIG. 2 is a diagram illustrating a relationship between an output pilot pressure from the electromagnetic proportional valve and the opening area of a supplying opening in a spool valve.

The spool valve 8 is a direction switching valve for controlling the supply and discharge flow rates of the hydraulic actuator 5 and switching the supply and discharge directions, and includes first and second pilot ports 8a and 8b respectively connected to the first and second electromagnetic proportional valves 10A and 10B, a pump port 8p connected to the hydraulic pump 2 via the pressure compensation valve 9, a tank port 8t connected to the oil tank 4, a first actuator port 8c connected to the first input/output port 5a of the hydraulic actuator 5, a second actuator port 8d connected to the second input/output port 5b of the hydraulic actuator 5, and a load pressure output port 8e connected to the second pilot port 9b of the pressure compensation valve 9 via a load pressure introduction oilway 11 described later. When the pilot pressure is not input into both first and second pilot ports 8a, 8b, the spool valve 8 does not control the supply and discharge of the hydraulic actuator 5, and when a load pressure output port 8e is located at a neutral position N where the load pressure port 8e is closed, the first pilot port 8a is input the pilot pressure and then is switched to the first operating position X; a supply opening 8f opens from the pump port 8p to the first actuator port 8c; the discharge output 8g opens from the second actuator port 8d to the tank port 8t; the load pressure opening 8h opens from a downstream side of the supply opening 8f to the load pressure output port 8e. In addition, the second pilot port 8b is input the pilot pressure, thereby switching to the second operating position, a supply opening 8f opens from the pump port 8p to the second actuator port 8d, the discharge port 8g opens from the first actuator port 8c to the tank port 8t, and the load pressure opening 8h opens from a downstream side of the supply opening 8f to the load pressure output port 8e. The opening area of the supply opening 8f is determined in accordance with the pilot pressure output from the first and second electromagnetic proportional valves 10A and 10B, as shown in the opening area characteristic diagram of FIG. 2, and the supply flow rate for the hydraulic actuator 5 is controlled by the opening area of the supply opening 8f. Furthermore, the spool valves 8 in the first and second actuation positions X and Y are opened by the load pressure opening 8h so that the outlet-side pressure of the spool valve 8 (the load pressure of the hydraulic actuator 5) is introduced into the load pressure introducing oilway 11.

The pressure compensation valve 9 includes a first pilot port 9a in which an inlet side pressure of the spool valve 8 is input, a second pilot port 9b in which an outlet side pressure of the spool valve 8 is input via the load pressure introduction oilway 11, and a spring 9c. The inlet side pressure of the spool valve 8 input to the first pilot port 9a is configured to push a valve body of the pressure compensation valve 9 to a closed side, and the outlet side pressure of the spool valve 8 input to the second pilot port 9b and the pressing pressure of the spring 9c are configured to push the valve body of the pressure compensation valve 9 to an open side. The opening area of the pressure compensation valve 9 is then controlled so that a differential pressure between the inlet side pressure and the outlet side pressure of the spool valve 8 is constant. In other words, in the case where the front and rear differential pressure of the spool valve 8 is greater than the pressing pressure of the spring 9c, the valve body of the pressure compensation valve 9 moves to the closed side and the opening area of the pressure compensation valve 9 is reduced and then the passage pressure loss is increased, thereby reducing the inlet pressure of the spool valve 8. On the other hand, in the case where the front and rear differential pressure of the spool valve 8 is lower than the pressing pressure of the spring 9c, the valve body of the pressure compensation valve 9 moves to the opening side and the opening area of the pressure compensation valve 9 is increased and then the passage pressure loss is reduced, thereby increasing the inlet pressure of the spool valve 8. In this way, the front and rear differential pressure of the spool valve 8 is held constant by such operations of the pressure compensation valve 9.

The first and second electromagnetic proportional valves 10A and 10B are operated by an output current from the controller 1 to output the pilot pressures to the first and second pilot ports 8a and 8b of the spool valve 8, respectively. In this case, the first and second electromagnetic proportional valves 10A and 10B are configured to increase or decrease the output pilot pressures in accordance with the output current value from the controller 1, and the output current value from the controller 1 is configured to increase or decrease in accordance with the operation amount of the operator 7, as will be described later.

Furthermore, the output ports of the first and second electromagnetic proportional valves 10A and 10B can be freely mounted with a measurement adapter (not shown), and the output pilot pressures from the first and second electromagnetic proportional valves 10A and 10B can be detected by connecting a pressure sensor (equates to the pressure detection means of the present invention) 12 to the measurement adapter.

Here, the supply flow rate from the spool valve 8 to the hydraulic actuator 5 is obtained by the opening area of the supply opening 8f of the spool valve 8, the front/rear differential pressure of the spool valve 8, and a flow rate coefficient by means of the following orifice formula (1).

$$Q = C \times A \times \sqrt{\Delta P} \quad (1)$$

In the above formula (1), Q is the supply flow rate to the hydraulic actuator 5 (the output flow rate from the spool valve 8), C is the flow coefficient, A is the opening area of the supply aperture 8f of the spool valve 8, and $\Delta P$ is the front and rear differential pressure of the spool valve 8.

As described above, the front and rear differential pressure $\Delta P$ of the spool valve 8 is held constant by the pressure compensation valve 9, and the opening area A of the supply opening 8f is determined in accordance with the pilot pressure output from the first and second electromagnetic proportional valves 10A and 10B. Thus, if the flow coefficient C is considered to be constant, the supply flow rate to the hydraulic actuator 5 is determined in accordance with the pilot pressure output from the first and second electromagnetic proportional valves 10A and 10B, even if the pump pressure of the hydraulic pump 2 and the load of the hydraulic actuator 5 fluctuate.

On the other hand, on the input side, the controller 1 is connected with an operation detection unit 13 that detects the operating direction and the operation amount of the operator 7, the pressure sensor 12 (when performing calibration), and the like, while on the output side, the controller 1 is connected with the pump proportional valve 3, the first and second proportional solenoid valves 10A and 10B and the like. Then, the controller 1 outputs a current as a control signal to the first and second electromagnetic proportional valves 10A and 10B based on the operation direction and the operation amount of the operator 7 input from the operation detection unit 13 during normal operations in which the calibration described later has not been performed. In this case, when the operator 7 is operated on one side, the current is output to the first electromagnetic proportional valve 10A, and when the operator 7 is operated on the other side, the current is output to the second electromagnetic proportional valve 10B. However, in the controller 1, the first, second corresponding data CD1 and CD2 are stored, which indicate a corresponding relationship between the operation amount of the operator 7 on one side and the operation amount of the operator 7 on the other side and the output current values to the first, second electromagnetic proportional valves 10A and 10B, and the current output to the first and second electromagnetic proportional valve 10A and 10B increases or decreases with the increase or decrease of the operation amount of the operator on the basis of the first, second corresponding data CD1 and CD2. Then, as described above, the first and second electromagnetic proportional valves 10A and 10B output the pilot pressure that increases or decreases in accordance with the output current value from the controller 1 to the spool valve 8, so that the spool valve 8 moves in a stroke in accordance with the pilot pressure and opens the supply opening 8f and the discharge opening 8g to control the supply flow and the discharge flow for the hydraulic actuator 5. Note that when performing the calibration described later, the current is output to the controller 1 to the first and second electromagnetic proportional valves 10A and 10B in a state where the operation of the operator 7 has not been performed. In addition, the controller 1 outputs a current value that increases or decreases in accordance with the operation amount of the operator 7 to the electromagnetic proportional valve 3 for the pump, thereby controlling the discharge flow rate of the hydraulic pump 2 to increase or decrease in accordance with the increase or decrease of the operation amount of the operator 7. However, the control of the electromagnetic proportional valve 3 for the pump will be omitted.

Furthermore, a monitoring device 15 is freely connected to the controller 1 for input/output. The monitoring device 15 is arranged, for example, in a cabin of a working machine, and includes a display screen (not shown), an operation means such as a keyboard, a touch panel, a dial, and the like, and is used when performing various types of displays, settings, and the like. However, in the present embodiment, the starting, working, and finishing of the calibration can be performed by the operation means of the monitoring device 15.

Furthermore, although the controller 1 is provided with a calibration control unit 16 that controls calibration to enable the corresponding relationship between the operation amount of the operator 7 and the supply flow rate to the hydraulic actuator 5 (the output flow rate from the control valve 6) to be a preset setting relationship, the calibration control unit 16 is provided with an output current control unit (corresponding to the output current control means of the present invention) 16a that outputs current to the first, second electromagnetic proportional valves 10A and 10 based on the operations of the monitoring device 15 when performing calibration, and a calibration control unit (corresponding to the calibration means of the present invention) 16b that calibrates the first, second corresponding data CD1 and CD2.

Furthermore, the calibration control unit 16 stores first and second setting data SD1 and SD2 which respectively indicate a setting relationship between an operation amount on the preset one side and the other side of the operator 7 and a supply flow rate to the hydraulic actuator 5. In this case, if the setting relationship in a case where the operator 7 is operated on one side is the same as that in a case where the operator 7 is operated on the other side, the first and second setting data SD1 and SD2 are the same.

Furthermore, the calibration control unit 16 inputs the first, second actual measured data AD1 and AD2 using the monitoring device 15 or via other input means or communication means. The first and second actual measured data AD1 and AD2 indicate a corresponding relationship between the pilot pressure output from the first, second electromagnetic proportional valves 10A and 10B to the spool valve 8 and the output flow rate output from the first, second actuator ports 8c and 8d of the spool valve 8, and are actually measured data at the stage before the control valve 6 is mounted on the working machine before the calibration is performed. The first and second actual measured data AD1 and AD2 are created, for example, on the supplier side of the control valve 6, based on the measurement results performed in the outgoing inspection of the control valve 6.

Furthermore, before performing calibration, the pressure sensor 12 is connected to the output ports of the first and second electromagnetic proportional valves 10A and 10B via a measurement adapter, and the pressure sensor 12 and the controller 1 are connected to input a detection signal from the pressure sensor 12 to the calibration control unit 16.

Then, the calibration control unit 16 controls the calibration for making the corresponding relationship between the operation amount of the operator 7 and the supply flow rate to the hydraulic actuator 5 (the output flow rate from the control valve 6) be the preset setting relationship based on the first, second setting data SD1 and SD2, and the first, second actual measured data AD1 and AD2. The calibration control will be described based on the flowchart in FIG. 3. Note that the calibration control in the case where the operator 7 is operated on one side is the same as the calibration control in the case where the operator 7 is operated on the other side, and thus the case where the operator 7 is operated on one side will be described as an example hereinafter.

First, the calibration control unit 16 sets the calibration point of the operation amount of the operator (e.g., 50%, 80%, 100%, etc. of the operation amount) when an operating signal for starting calibration work is input from the monitoring device 15 (step S1). The calibration point of the operation amount can be arbitrarily set and changed by the monitoring device 15.

Then, based on the first setting data SD1, a supply flow rate corresponding to the operation amount of the calibration point is obtained according to the preset setting relationship, and the supply flow rate is set as the set supply flow rate of the calibration point (step S2).

Next, based on the first actual measured data AD1, an actual measured value of the output pilot pressure from the first electromagnetic proportional valve 10A when the supply flow rate becomes the set supply flow rate of the calibration point is obtained, and the output pilot pressure is set to the target pilot pressure of the calibration point (step S3).

The operation amount, the set supply flow rate, and the target pilot pressure of the calibration point set in the steps S1 to S3 are displayed on the monitoring device 15.

Subsequently, based on the operation of the monitoring device 15, a current is output from the output current control unit 16a to the first electromagnetic proportional valve 10A. Then, while monitoring the output pilot pressure from the first electromagnetic proportional valve 10A detected by the pressure sensor 12, the output current value to the first electromagnetic proportional valve 10A is adjusted so that the output pilot pressure becomes the target pilot pressure of the calibration point (step S4). This adjustment of the output current value continues until the output pilot pressure detected by the pressure sensor 12 is within a set range of the target pilot pressure (steps S4, S5).

Then, in the case where the output pilot pressure detected by the pressure sensor 12 has fallen within the set range of the target pilot pressure, the calibration control unit 16b calibrates the first corresponding data CD1 stored in the controller 1 as a calibrated output current value corresponding to the operation amount of the tool of the calibration point, using the output current value to the first electromagnetic proportional valve 10A when the output pilot pressure has fallen within the set range of the target pilot pressure (step S6).

In this case, when the calibration point is a single point, the calibration control unit 16b further takes the difference between the calibrated output current value and the output value of the calibration point in the first corresponding data CD1 stored in the controller 1 as the calibration amount, calibrates the correspondence relationship between the operation amount of the operator of the first corresponding data CD1 within the entire range of the operation amount of the operator, and ends the calibration.

Figure 3:
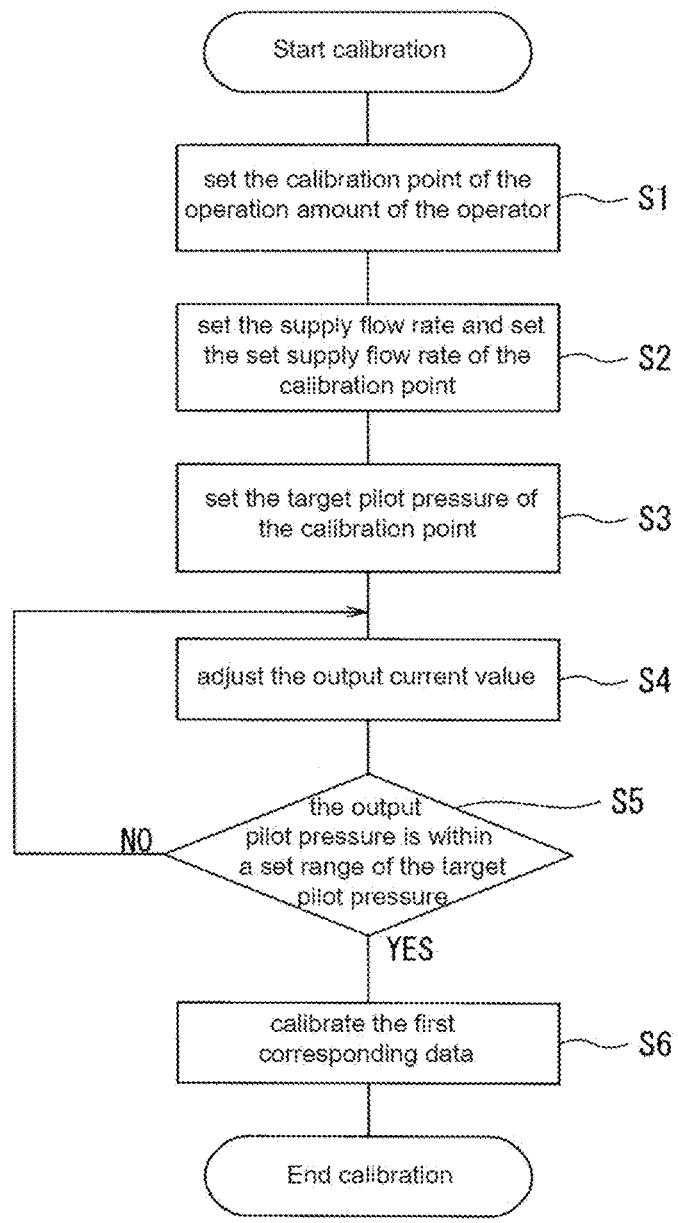
FIG. 3 is a flowchart illustrating a calibration procedure.

Furthermore, in the case of a plurality of calibration points, although not shown in the flowchart diagram of FIG. 3, after the steps S1 to S5 are performed for each calibration point, the corresponding relationship between the operation amount of the operator in the first corresponding data CD1 and the output current value to the first electromagnetic proportional valve 10A over the entire range of the operation amount of the operator is calibrated by using the calibrated output current value at the plurality of calibration points, and ends the calibration.

Furthermore, calibration is also carried out to calibrate the correspondence relationship between the operation amount of the operator in the second corresponding data CD2 and the output current value to the second electromagnetic proportional valve 10B. Then, after the calibration is completed, the current output to the first and second electromagnetic proportional valves 10A and 10B in the case where the tool 7 is operated during normal work is carried out using the calibrated first and second corresponding data CD1 and CD2, so that the relationship between the operation amount of the operator and the supply flow rate to the hydraulic actuator 5 is controlled so as to become the setting relationship (the relationship set by the first and second setting data).

FIG. 4 illustrates an example of specific numerical values of the corresponding data CD (first or second corresponding data CD1, CD2), setting data SD (first or second setting data SD1, SD2), measured data AD (first or second actual data AD1, AD2), output current values calibrated in calibration, and configured corresponding data CD (first or second corresponding data CD1, CD2).

In the present embodiment configured as described, the hydraulic system of the working machine includes a hydraulic actuator 5, a control valve 6 that controls the supply flow rate to the hydraulic actuator 5, an operator 7 that is operated to drive the hydraulic actuator 5, a controller 1 that controls the control valve 6 based on the operation of the manipulator 7, and the like. In calibrating the corresponding relationship between the operation amount of the operator 7 and the supply flow rate to the hydraulic actuator 5 to a preset setting relationship, the control valve 6 includes a spool valve 8 that opens an opening 8f for supplying the hydraulic actuator 5 with an opening area corresponding to an input pilot pressure, a pressure compensation valve 9 that keeps the front and rear differential pressures of the supply opening 8f of the spool valve 8 constant, and an electromagnetic proportional valve 10 (first, second electromagnetic proportional valves 10A, 10B) that outputs a pilot pressure to the spool valve 8 in accordance with a current vale output from the controller 1. Meanwhile, the controller 1 includes corresponding data CD (first, second corresponding data CD1, CD2) of an operator operation amount and an output current value to the electromagnetic proportional valve 10, and outputs the current value corresponding to the operator operation amount to the electromagnetic proportional valve 10 based on the corresponding data CD, thereby controlling the control valve 6. The calibration system for calibrating is configured to perform calibration using actual measured data AD (first, second actual measured data AD1, AD2) that actually measures the correspondence relationship between the output pilot pressure from the electromagnetic proportional valve 10 and the supply flow rate output from the control valve 6 before the control valve 6 is mounted on the working machine, and further includes: a pressure sensor 12 that detects an output pilot pressure from the electromagnetic proportional valve 10 to the spool valve 8, an output current control unit 16a that outputs a current to the electromagnetic proportional valve 10 when performing calibration, and a calibration control unit 16b that takes the output pilot pressure from the electromagnetic proportional valve 10 in the actual measured data AD at a supply flow rate corresponding to the preset setting relationship for the operation amount of the operator of the calibration point as a target pilot pressure, takes the output current value to the electromagnetic proportional valve 10 from the output current control unit 16a when the said pilot pressure becomes the target pilot pressure, and calibrates the corresponding data CD.

In this manner, in the present embodiment, the corresponding data CD of the output current value to the electromagnetic proportional valve 10 and the operation amount of the operator is calibrated by using the actual measured data AD that actually measures the correspondence relationship between the output pilot pressure from the electromagnetic proportional valve 10 and the supply flow rate output from the control valve 6. Although the correspondence relationship between the operation amount of the operator and the supply flow rate to the hydraulic actuator 5 can be calibrated to become a preset setting relationship, the actual measured data AD is actually measured in the stage before the control valve 6 is installed in the working machine, and thus it is possible to achieve a large efficiency of calibration without the effort and time required to connect the flow meter to the control valve in a state where each working machine is mounted on the working machine for measurement after the control valve 6 is mounted on the working machine. In addition, it does not require a control valve with a special structure for calibration, and can contribute to reducing cost increases.

Moreover, in this case, the control valve 6 has a pressure compensation valve 9 that keeps the forward and backward differential pressure of the spool valve 8 having the opening 8f for supplying to the hydraulic actuator 5 constant. Therefore, regardless of the variation of the load pressure of the hydraulic actuator 5 and the discharge pressure of the hydraulic pump 2, the control valve 6 mounted on the working machine controls the supply flow rate to the hydraulic actuator 5 in the same correspondence as the measured data AD measured before the control valve 6 is mounted on the working machine, and as a result, high-precision calibration can be performed even using the measured data AD measured before the control valve 6 is mounted on the working machine.

It should be noted that the present invention is not limited to the above-described embodiments, and the configuration can also be carried out by an operator as part of the control carried out by the calibration control unit 16 according to the above-described embodiments. For example, in the above embodiment, the actual measured data is input to the calibration control unit 16, and the calibration control unit 16 is configured to automatically set the target pilot pressure based on the actual measured data, but the operator can also be configured to set the target pilot pressure based on the actual measured data. However, even in the case where the operator carries out part of the control executed by the calibration control unit 16, the calibration of the corresponding data is carried out by the calibration control unit (calibration means of the present invention) 16b.

In the above embodiment, although the output current control unit (output current control means) 16a and the calibration control unit (calibration means) 16b are provided in the in-vehicle controller (control means) 1, the output current control unit 16a and the calibration control unit 16b can also be provided in an external controller that is freely connected to the in-vehicle controller 1, so as to connect the external controller to the in-vehicle controller when performing calibration.

Furthermore, in the above embodiment, as the actual measured data used in the calibration, the actual measured data that the correspondence relationship between the output pilot pressure from the electromagnetic proportional valve and the supply flow rate output from the control valve in the stage before the control valve is installed in the working machine is used, but the above embodiment is not limited thereto. The actual measured data in which the correspondence relationship between the input current value to the electromagnetic proportional valve and the supply flow rate output from the control valve is measured in the stage before the control valve is installed in the working machine can also be used. The actual measured data in this case is also created, for example, on the supplier side of the control valve, based on the measurement results performed in the outgoing inspection of the control valve.

Then, in the case where calibration is carried out using actual measured data in which the correspondence relationship between the input current value to the electromagnetic proportional valve and the supply flow rate output from the control valve is actually measured, the calibration system is provided with an output current control means that outputs current to the electromagnetic proportional valve when the calibration is executed, and a calibration means that calibrates the corresponding data, taking an input current value to the electromagnetic proportional valve in the case where the actual measured data corresponds to a set flow rate set in the preset operation amount of the calibration point as an output current value corresponding to the operation amount of the calibration point.

In this manner, in the case where calibration is carried out using the actual measured data that actually measures the correspondence relationship between the input current value to the electromagnetic proportional valve and the supply flow rate output from the control valve in the stage before the control valve is installed in the working machine, it is not necessary to detect the pilot pressure as in the above embodiment, and the calibration can be carried out with higher precision more easily. Furthermore, in this case, if the actual measured data is inputted into a two-dimensional code or the like or stored on a server, the calibration can be carried out even more easily by reading the two-dimensional code, communicating with the server, and so on.

INDUSTRIAL APPLICABILITY

The present invention can be used to calibrate a correspondence relationship between an operation amount of an operator in a hydraulic system of a working machine such as a hydraulic excavator and a supply flow rate to a hydraulic actuator.

The invention claimed is:

1. A calibration system for a hydraulic system of a working machine, comprising:
   a hydraulic actuator;
   a control valve for controlling a supply flow rate of the hydraulic actuator, including:
      a spool valve for supplying the hydraulic actuator, which opens an opening with an opening area corresponding to a pilot pressure,
      a pressure compensation valve connected to an inlet side and an outlet side of the spool valve, and configured to keep a differential pressure between an inlet side pressure and an outlet side pressure constant, and
      an electromagnetic proportional valve which outputs the pilot pressure to the spool valve proportional to a current;
   an operator input for driving the hydraulic actuator;
   a pressure sensor for detecting the pilot pressure from the electromagnetic proportional valve to the spool valve;
   an output current control unit for outputting the current to the electromagnetic proportional valve;
   a controller for controlling the control valve based on an operation of the operator input, the controller configured to detect the operator input, and direct the output current control unit to output the current to the electromagnetic proportional valve based on a corresponding data representing a corresponding relationship between the operator input and the supply flow rate of the hydraulic actuator; and
   a calibration control unit configured to:
      set a calibration point of the operator input,
      reference a setting data to determine the supply flow rate at the calibration point,
      set a target pilot pressure at the calibration point,
      measure the pilot pressure from the electromagnetic proportional valve via the pressure sensor,
      direct the output current control unit to adjust the current to a calibrated output current where the pilot pressure is the same as the target pilot pressure at the calibration point, and
      adjust the corresponding data stored in the controller.

2. A calibration system for a hydraulic system of a working machine, comprising:
   a hydraulic actuator;
   a control valve for controlling a supply flow rate of the hydraulic actuator, including:
      a spool valve for supplying the hydraulic actuator, which opens an opening with an opening area corresponding to a pilot pressure,
      a pressure compensation valve connected to an inlet side and an outlet side of the spool valve, and configured to keep a differential pressure between an inlet side pressure and an outlet side pressure constant, and
      an electromagnetic proportional valve which outputs the pilot pressure to the spool valve proportional to a current;
   an operator input for driving the hydraulic actuator;
   an output current control unit for outputting the current to the electromagnetic proportional valve;
   a controller for controlling the control valve based on an operation of the operator input, when a corresponding relationship between an operation amount of the operator input and the supply flow rate to the hydraulic actuator is calibrated to a preset setting, the controller configured to direct the output current control unit to output the current to the electromagnetic proportional valve based on a corresponding data; and
   a calibration control unit configured to:
      set a calibration point of the operator input and reference a setting data to determine the supply flow rate at the calibration point,
      set a target pilot pressure at the calibration point and measure the pilot pressure from the electromagnetic proportional valve,
      direct the output current control unit to adjust the current to a calibrated output current where the pilot pressure is the same as the target pilot pressure at the calibration point, and
      adjust the corresponding data stored in the controller.

* * * * *